United States Patent [19]

Tanaami et al.

[11] Patent Number: 4,473,534
[45] Date of Patent: * Sep. 25, 1984

[54] GAS DISTRIBUTOR FOR FLUIDIZED BED

[75] Inventors: Kazuo Tanaami, Ebina; Nobuo Matsuda, Kamakura, both of Japan

[73] Assignee: Director-General, Agency of Industrial Science and Technology, Tokyo, Japan

[*] Notice: The portion of the term of this patent subsequent to Jun. 28, 2000 has been disclaimed.

[21] Appl. No.: 443,450

[22] Filed: Nov. 22, 1982

Related U.S. Application Data

[63] Continuation of Ser. No. 237,938, Feb. 25, 1981, abandoned.

[30] Foreign Application Priority Data

May 7, 1980 [JP] Japan .................................. 55-59451

[51] Int. Cl.³ ............................................ F27B 15/10
[52] U.S. Cl. .................................. 422/311; 34/57 R; 48/77; 48/62 R; 422/143; 432/58
[58] Field of Search .................... 422/143, 311; 48/77, 48/62 R, 87; 126/163 R, 163 A, 152 R; 110/323, 336, 182.5, 338, 310, 245; 165/9.1, 9.3; 432/58, 15; 34/57 A, 57 R; 52/198, 303, 245, 602

[56] References Cited

U.S. PATENT DOCUMENTS

| | | | |
|---|---|---|---|
| 2,819,051 | 1/1958 | Harris | 165/9.3 |
| 2,936,162 | 5/1960 | Coberly | 165/9.1 |
| 3,220,367 | 11/1965 | Stein | 52/245 |
| 3,782,903 | 1/1974 | Kramer | 422/143 |
| 3,792,960 | 2/1974 | Gion | 432/58 |
| 3,863,359 | 2/1975 | Grega | 34/57 R |
| 3,982,900 | 9/1976 | Malgarini et al. | 23/284 |
| 4,073,064 | 2/1978 | Steever et al. | 34/57 A |
| 4,372,919 | 2/1983 | Kubo et a. | 422/143 |
| 4,390,501 | 6/1983 | Tanaami et al. | 422/143 |

FOREIGN PATENT DOCUMENTS 808120 5/1977 U.S.S.R. ............................. 422/143

Primary Examiner—Peter F. Kratz
Assistant Examiner—Joye L. Woodard
Attorney, Agent, or Firm—Frishauf, Holtz, Goodman and Woodward

[57] ABSTRACT

A high temperature (1000° C. or higher) gas distributor for a fluidized bed, comprising a plurality of plates which are made of an oxide-based burned refractory material and which are reduced in thickness in the longitudinal direction thereof leaving both sides thicker, refractory supporting bricks holding in position both sides of the plates, and refractory holding bricks holding in position the above refractory supporting bricks and the ends of the plates.

15 Claims, 7 Drawing Figures

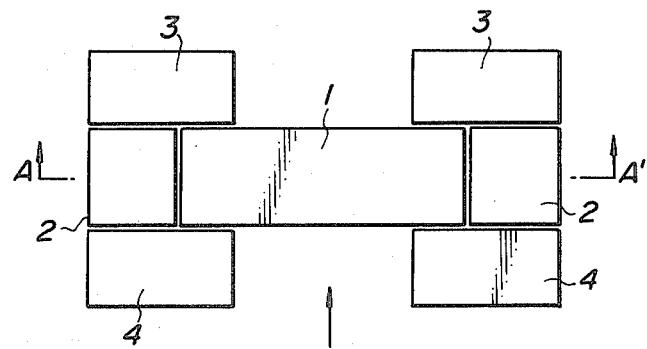
FIG. 1
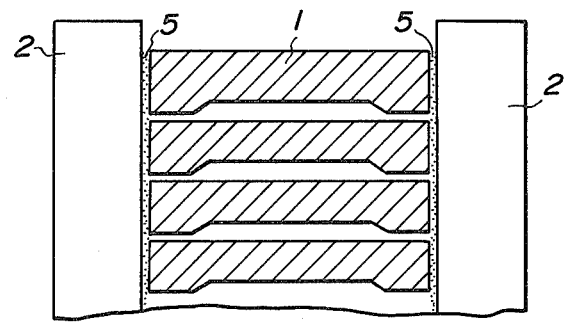
FIG. 2
FIG. 3
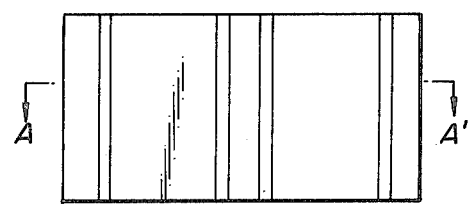
(a)
(b)

GAS DISTRIBUTOR FOR FLUIDIZED BED

This is a continuation of application Ser. No. 237,938 filed Feb. 25, 1981, now abandoned.

BACKGROUND OF THE INVENTION

This invention relates to a gas distributor for a fludized bed and more particularly to a gas distributor for use in introduction of high temperature (higher than 1000° C., particularly about 1,000° C. to 1,700° C.) gas into a reactor from the bottom or side wall thereof, where solid particles are fluidized by gas.

In a reactor in which solid particles are fluidized by gas, it is desirable to provide a gas distributor in an inlet portion through which the gas is introduced, so that the particles may be mixed as uniformly as possible and be brought into good contact with a fluid. For example, U.S. Pat. No. 3,661,543 discloses a system in which a plate grid is placed at the bottom of a gasification vessel in order to disperse gas uniformly.

Where the temperature of the system is below about 1,000° C., it is possible to use a gas distributor made of a metal material. However, when it is higher than about 1,000° C., it is not possible to use such metal materials. Therefore, where the temperature of the gas to be introduced into the reactor, or the temperature of the fluidized bed is higher than 1,000° C., it has been the practice not to provide such a gas distributor even though sacrificing the contact efficiency of gas and solid particles.

However, where it is desired to provide a gas distributor in such systems where the temperature is higher than 1,000° C., it may be possible to utilize oxide-based refractories for production of the gas distributor. For example, the bottom portion has been filled with oxide-based refractory beads for the gas distributor. With this method, however, an insufficient effect has been obtained because, in some cases, such beads are blown up or pushed to one side in the fluidized bed.

SUMMARY OF THE INVENTION

It is an object of this invention to provide a gas distributor for use in introduction of high temperature gas having a temperature of about 1,000° C. or higher, particularly about 1,000° C. to 1,700° C., into a reactor from the bottom or side wall thereof.

As a result of extensive investigations on a gas distributor which is used for the purposes of achieving a uniform dispersion of gas and/or of preventing a backward flow and dropping of solid particles in introducting high temperature gas into a reactor where solid particles are fluidized by gas, through the bottom or side portion thereof, we have developed a plate grid type of gas distributor comprising a plurality of oxide-based burned refractory plates interposed between refractory bricks.

BRIEF DESCRIPTION OF THE DRAWINGS

FIGS. 1 and 4 are each a cross sectional front view of a respective gas distributor according to this invention;

FIG. 2 is a partially cut-away plan view;

FIG. 3a is a front view of another plate;

FIG. 3b is a cross sectional view, taken along the line A—A', of FIG. 3a; and

DETAILED DESCRIPTION OF THE INVENTION

As illustrated in FIGS. 1 and 2, the gas distributor of this invention comprises a plurality of plates 1 whose thickness is reduced by cutting away an intermediate part of the plates in the longitudinal direction thereof, leaving both side ends thereof uncut or unchanged in thickness, refractory supporting bricks 2 holding in position the both sides of the plates 1, and refractory holding bricks 3 and 4 holding in position the refractory supporting bricks 2 and the ends of the plates 1. FIGS. 3a and 3b illustrate another embodiment of the gas distributor of this invention. In this embodiment, each plate is reduced in thickness by cutting away part of the plates in the longitudinal direction thereof leaving both ends and the central portion of the plates 1 uncut or unchanged in thickness. FIGS. 3a and 3b show, respectively, a plan view and a sectional view of a plate 1.

Figure 4:
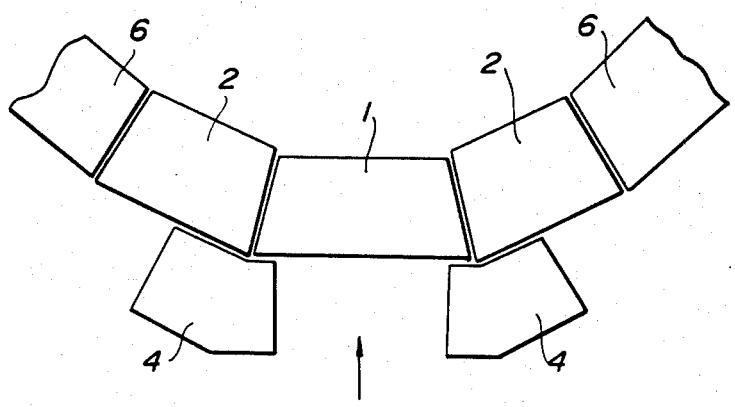
Figure 5A:
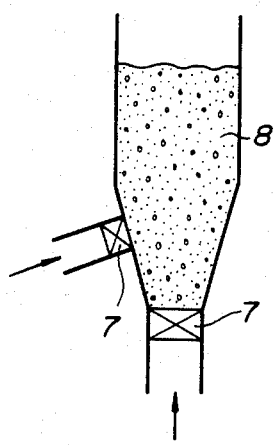
FIGS. 5a and 5b are each an illustrative view of a respective gas distributor of this invention, which is in practical use.
Figure 5B:
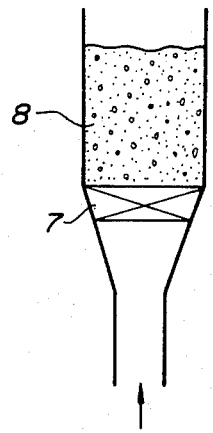

FIG. 4 shows another fundamental structure of the gas distributor of this invention. A plurality of plates 1, which are made of an oxide-based burned refractory material, is trapezoidal in form, and is reduced in thickness by cutting away part of the plates in the longitudinal direction leaving both ends of the plate uncut or unchanged in thickness. By holding in position both ends of the plate by the use of refractory supporting bricks 2, both ends of the plate and the end of the plate at the downstream side in the direction of the gas flow (direction of arrow in FIG. 4) are supported. Furthermore, both ends of the plate and the refractory bricks at the upstream side in the gas flow direction are supported by refractory holding bricks 4. In the case of a gas distributor having the above structure, of course, a plate having a sectional view as shown in FIG. 3b can be used.

In the gas distributor of this invention, as illustrated in the FIGS., refractory supporting bricks 2 and refractory holding bricks 4 may be provided separately or may be combined together.

As apparent from the FIGS., the gas distributor of this invention comprises a plurality of plates placed in such a manner that they come into contact with each other, said plates being reduced in thickness by cutting away part of the plates in the longitudinal direction leaving both sides uncut or unchanged in thickness (in some cases, including the central portion of the plate), so that the cut-away portion acts as a gas flow path. Both side ends of each of the plates 1 are held in position by refractory bricks 2 and if necessary, fixed firmly to bricks 2 by the use of mortar.

Mortar which can be used includes zirconia mortar. This mortar not only secures the plates 1, but also acts to absorb heat-expansion of the plates 1 owing to a high temperature gas.

Furthermore, refractory bricks 3 and 4 are placed at both the upstream side and the downstream side of the gas flow to hold the gas distributor parts in position.

In the case of the embodiment as shown in FIG. 4, the form of the plates 1 is trapezoidal and the plates 1 and the refractory bricks 2 are supported and secured to each other by the formed arch as shown in FIG. 4. Therefore, the refractory holding bricks 4 at the downstream side of the gas flow can be omitted and the refractory holding bricks 4 need only be placed at the upstream to hold the plates 1 in position. In this case, there is a clearance between the plates 1 and the refractory supporting bricks 2. The refractory supporting bricks 2 are supported and secured by the arch together with the adjacent refractory bricks 6.

The gas distributor of this invention comprises, as described above, a gas distribution plate arrangement comprising a plurality of plates, and bricks for securing the gas distribution plates. The flow rate of the high temperature gas passing through the gas distribution plate is between about 0.5 to 100 meters per second and the surface of the gas distribution plate which comes into contact with solid particles is subject to vigorous abrasion. It is, therefore, necessary to use a material having excellent abrasion resistance as the plate. Thus, as an oxide-based burned refractory material constituting the plate of this invention, sintered alumina ($Al_2O_3$ content: more than 91%), sintered zirconia ($ZrO_2$ content: more than 90%), etc. are preferably used. Since these materials are molded prior to the sintering, they are excellent in moldability, and it is therefore possible to produce those plates having relatively complex forms.

In general, it is desirable that with regard to the dimensions of the plates constituting the gas distribution plates, both ends where the thickness remains unchanged are from 5 to 50 millimeters, the area where the thickness is reduced by cutting away in the longitudinal direction is from 4 to 50 millimeters, the length is from 200 to 1,000 millimeters, and the height (width) is from 80 to 300 millimeters. The difference in thickness of the plate should be adjusted within the range of from 0.2 to 10 millimeters, and in accordance with this invention, those plates having a difference in thickness of from 0.2 to 1 millimeter can easily be produced.

As described above, the heat expansion in the longitudinal direction of the plate is absorbed by the mortar 5 packed between the plate and the refractory bricks in the case of the structure as shown in FIGS. 1 and 2. On the other hand, in the case of the structure as shown in FIG. 4, the heat expansion is absorbed by the clearance between the plate and the refractory bricks. In either case, the heat expansion of the plates in the gas flow direction is absorbed by the clearance between the plates and the refractory bricks. In the gas flow direction, the plates can move freely within a certain range because they are not fixed by, for example, mortar, and therefore neither heat expansion nor mechanical troubles occur.

Using a gas distributor having the structure as shown in FIGS. 1 and 2 and prepared from zirconia burned bricks (dimension of plate: length, 200 millimeters; height, 80 millimeters; and thickness, 3 millimeters, and clearance between plates: 0.9 millimeter), 1,700° C. gas prepared by mixing and burning 83 $Nm^3$/hr of oxygen, 84 $Nm^3$/hr of hydrogen and 300 Kg/hr of steam (800° C.) by the use of a burner was distributed in the flow thereof and introduced into a fluidized bed reactor through the bottom inlet thereof to fluidize alumina particles having a diameter of 0.9 millimeter. Under these conditions, the operation was continued for 10 days, and the contact between the gas fluid and alumina particles was good. At the end of the period, there was no abnormality with the gas distributor. Even though the flow of gas was stopped, no dropping of particles and backward flow were observed.

The gas distributor of this invention is used in a fluidized bed where a heat absorption reaction occurs, and is particularly suitable for use in a fluidized bed where cracking of heavy oil, gasification of coal, gasification of tar sand, or the like is carried out.

We claim:

1. A gas distributor for a fluidized bed of a gas with particles maintained in suspension above the gas distributor, comprising:
    a plurality of adjacently mounted plates (1) made of an oxide-based burned refractory material, said plates having side portions of given thickness, and central portions between said side portions, said central portions being of reduced thickness relative to the thickness of said side portions, said central reduced thickness portions each extending over a substantially major portion of said plates and defining with an adjacent plate at least one gas flow passage which is of such size that said particles cannot fall through said at least one gas flow passage;
    said reduced thickness central portions of said plates having respective substantially flat surface portions which define substantially elongated, flat, flow passages with substantially flat facing portions of an adjacent plate, the distance between said facing substantially flat surface portions being no greater than the particle size of the particles to be maintained in the fluidized bed;
    a plurality of refractory supporting bricks (2) positioned adjacent to said side portions of said adjacent plates for holding said side portions of said plates in position; and
    a plurality of refractory holding bricks (4) positioned adjacent said supporting bricks (2) and said plates (1) in the vicinity of said side portions of said plates, for engaging and holding said supporting bricks and said plates in relative position.

2. The gas distributor of claim 1 wherein said plates are reduced in thickness in the longitudinal direction thereof, both sides and a central portion thereof having a greater thickness than the reduced thickness portions, a major reduced thickness portion being defined between said central thicker portions having opposed substantially flat surface positions extending between said central greater thickness portion and said sides.

3. The gas distributor of claim 1 wherein said plates are made of sintered alumina.

4. The gas distributor of claim 1 wherein said plates are made of sintered zirconia.

5. The gas distributor of claim 1, wherein said refractory supporting bricks are made of sintered alumina.

6. The gas distributor of claim 1, wherein said refractory supporting bricks are made of sintered zirconia.

7. The gas distributor of claim 1 wherein said plates have a generally trapezoidal shape when viewed from the top, in a direction perpendicular to the direction of gas flow through said gas flow passage, said side portions being the opposite slant sides of the trapezoidal shape, said slant sides being adjacent said refractory supporting bricks for holding said plates in position relative to said supporting bricks at one of said slant sides in one direction of the gas flow (i.e., the downstream direction), and refractory holding bricks holding said plates and said refractory supporting bricks at the opposite slant side thereof (i.e., in the upstream gas flow direction).

8. The gas distributor of claim 7 wherein said plates are reduced in thickness in the longitudinal direction thereof, both slant sides and a central longitudinal portion thereof having a greater thickness than the reduced thickness portions, a major reduced thickness portion being defined between said central thicker longitudinal portion and each of said slant side portions, said reduced thickness portions having opposed substantially flat surface portions extending between said central greater thickness portion and said slant sides.

9. The gas distributor of claim 7 wherein said plates are made of sintered alumina.

10. The gas distributor of claim 7 wherein said plates are made of sintered zirconia.

11. The gas distributor of claim 7, wherein said refractory supporting bricks are made of sintered alumina.

12. The gas distributor of claim 7, wherein said refractory supporting bricks are made of sintered zirconia.

13. The gas distributor of claim 7, wherein said reduced thickness portions of said plates are cut away portions.

14. The gas distributor of claim 1, wherein said reduced thickness portions of said plates are cut away portions.

15. The gas distributor of claim 1 wherein said plates are of reduced thickness over the complete area thereof except for said side portions, said substantially flat surface portions extend substantially between said side portions.

* * * * *